United States Patent
Hayes et al.

(10) Patent No.: US 8,959,610 B2
(45) Date of Patent: *Feb. 17, 2015

(54) SECURITY BRIDGING

(71) Applicant: Constellation Technologies LLC, Plano, TX (US)

(72) Inventors: Hassler Hayes, Munster Hamlet (CA); Nannra Anoop, Orleans (CA); John Watkins, Ottawa (CA)

(73) Assignee: Constellation Technologies LLC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/726,894

(22) Filed: Dec. 26, 2012

(65) Prior Publication Data
US 2013/0133058 A1 May 23, 2013

Related U.S. Application Data

(63) Continuation of application No. 11/105,843, filed on Apr. 14, 2005, now Pat. No. 8,370,917.

(60) Provisional application No. 60/565,063, filed on Apr. 23, 2004.

(51) Int. Cl.
| | |
|---|---|
| *G06F 9/00* | (2006.01) |
| *H04L 29/06* | (2006.01) |
| *H04L 9/32* | (2006.01) |
| *H04L 29/08* | (2006.01) |
| *G06F 21/41* | (2013.01) |

(52) U.S. Cl.
CPC ............... *H04L 63/08* (2013.01); *H04L 63/166* (2013.01); *H04L 63/0869* (2013.01); *H04L 9/3263* (2013.01); *H04L 63/0281* (2013.01); *H04L 63/0823* (2013.01); *H04L 63/083* (2013.01); *H04L 63/0876* (2013.01); *H04L 63/102* (2013.01); *H04L 67/22* (2013.01); *G06F 21/41* (2013.01)
USPC .............. 726/12; 713/151; 713/153; 713/168

(58) Field of Classification Search
None
See application file for complete search history.

(56) References Cited

U.S. PATENT DOCUMENTS

| | | | |
|---|---|---|---|
| 7,283,505 B1 | 10/2007 | Meenan et al. | |
| 7,587,598 B2 * | 9/2009 | Ohba et al. ..................... | 713/169 |
| 2002/0003879 A1 * | 1/2002 | Ibaraki et al. .................. | 380/201 |
| 2002/0035699 A1 * | 3/2002 | Crosbie .......................... | 713/201 |
| 2002/0116637 A1 | 8/2002 | Deitsch et al. | |
| 2003/0028805 A1 * | 2/2003 | Lahteenmaki ................ | 713/201 |
| 2003/0035409 A1 | 2/2003 | Wang et al. | |
| 2003/0137976 A1 | 7/2003 | Zhu et al. | |
| 2004/0103275 A1 * | 5/2004 | Ji et al. .......................... | 713/150 |
| 2004/0215782 A1 | 10/2004 | Syed | |
| 2005/0088977 A1 | 4/2005 | Roch et al. | |
| 2005/0177515 A1 | 8/2005 | Kalavade et al. | |

\* cited by examiner

*Primary Examiner* — Fatoumata Traore
(74) *Attorney, Agent, or Firm* — Christopher & Weisberg, P.A.

(57) ABSTRACT

A network media gateway is used to bridge trust between a Service Provider network and subscriber devices. The gateway is authenticated by the Service Provider by using knowledge of network topology. Subscriber devices are authenticated in response to subscriber input to the gateway via an interface. Trusted subscriber devices can be tightly coupled with the Service Provider network, thereby facilitating delivery of QoE. Mobile and remote subscriber devices may also be authenticated. The gateway may also facilitate establishment of VPNs for peer-to-peer communications, and dynamically adjustable traffic, policy and queue weightings based on usage patterns.

19 Claims, 7 Drawing Sheets

SECURITY BRIDGING

CROSS-REFERENCE TO RELATED APPLICATION

This application is a continuation of U.S. patent application Ser. No. 11/105,843, filed Apr. 14, 2005, entitled SECURITY BRIDGING, which claims priority to U.S. Provisional Application No. 60/565,063, filed Apr. 23, 2004, entitled NETWORK SECURITY AND NETWORK MEDIA GATEWAY, the entirety of which both are incorporated herein by reference.

FIELD OF THE INVENTION

This invention is generally related to the field of network security, and more particularly to security bridging associated with access technology to extend trust to subscriber devices.

BACKGROUND OF THE INVENTION

Network access technologies such as cable, DSL and satellite can be used to provide broadband services to homes and small businesses. However, the performance of each of these technologies can be inconsistent. For example, performance may be affected by weather conditions and network use by other subscribers. Further, the current generation of residential gateways, set top boxes and other broadband Customer Premises Equipment ("CPE") do not adequately support provision of a quantifiable Quality of Experience ("QoE"). One problem inhibiting deployment of equipment and services capable of maintaining QoE metrics is that relatively tight coupling of services, protocols, applications and network management are required to guarantee QoE. Such tight coupling is impractical when, as is currently the case, subscriber devices are viewed as insecure by service providers, and hence not trusted.

Another problem inhibiting deployment of equipment and services capable of maintaining QoE metrics in the home is that DiffServ-based QoS is basically static. Currently, a typical broadband home may have video, voice and data sessions managed by a single DiffServ algorithm. That single DiffServ algorithm is not typically capable of maintaining QoE when a subscriber employs multiple premium sessions with multiple applications. Similarly, numerous instances of sessions with multiple applications is problematic. Similarly, changing the set of premium sessions to another set over time is problematic.

SUMMARY OF THE INVENTION

In accordance with the invention, apparatus for providing communications service from a network to at least one subscriber device includes a gateway device capable of being authenticated by the network, and further capable of facilitating authentication of the subscriber device, whereby security may be bridged from the network to the subscriber device by authenticating both the gateway device and the subscriber device. Network topology may be used at least in-part to authenticate the gateway device. Subscriber input may be used at least in-part to authenticate subscriber devices. The gateway may provide an authenticated mobile subscriber device with a certificate of mobility that can be presented to the network outside the subscriber premises in exchange for service. Further, a remote device outside the subscriber premises may be authenticated for service by employing the gateway to validate the service on behalf of the remote device.

By authenticating both the gateway device and the subscriber device the Service Provider can reasonably trust the authenticated subscriber device, i.e., bridge trust to the authenticated subscriber device. Further, trusted subscriber devices can be tightly coupled with the gateway and other devices in the Service Provider network because they are deemed to be secure and trusted. Hence, providing a quantifiable QoE is facilitated by bridging of security via the gateway.

The gateway may also be employed to support self-learning for queuing and application mapping. For example, the gateway may function as a policy enforcement point for delivery of multiple, simultaneous sessions of varying media with differing performance requirements, which may change in real time, with deterministic Quality of Experience ("QoE") such that individual services can be billed. A gateway agent learns the behavior of the subscriber's LAN and data usage patterns through observation. Once a usage pattern is recognized, the gateway policy and traffic model is updated. Further, queue weightings may be dynamically adjusted based on current usage to allow for the proper session service quality levels to be met. Because the queue algorithms running over time have changing weightings, QoE support is improved relative to static weighting.

The gateway may also be employed to support peer-to-peer services. An authorized gateway containing a VPN client detects Peer-to-peer applications associated with the subscriber. In response to detection of operation of a peer-to-peer application the gateway notifies the Service Provider in order to enable billing. Further, if multiple users are participating in peer-to-peer transactions with the subscriber then the subscriber's gateway can establish a closed VPN network of authorized users. The VPN is establish by the gateway uploading a VPN client to each remote user's device.

DETAILED DESCRIPTION

Figure 1:
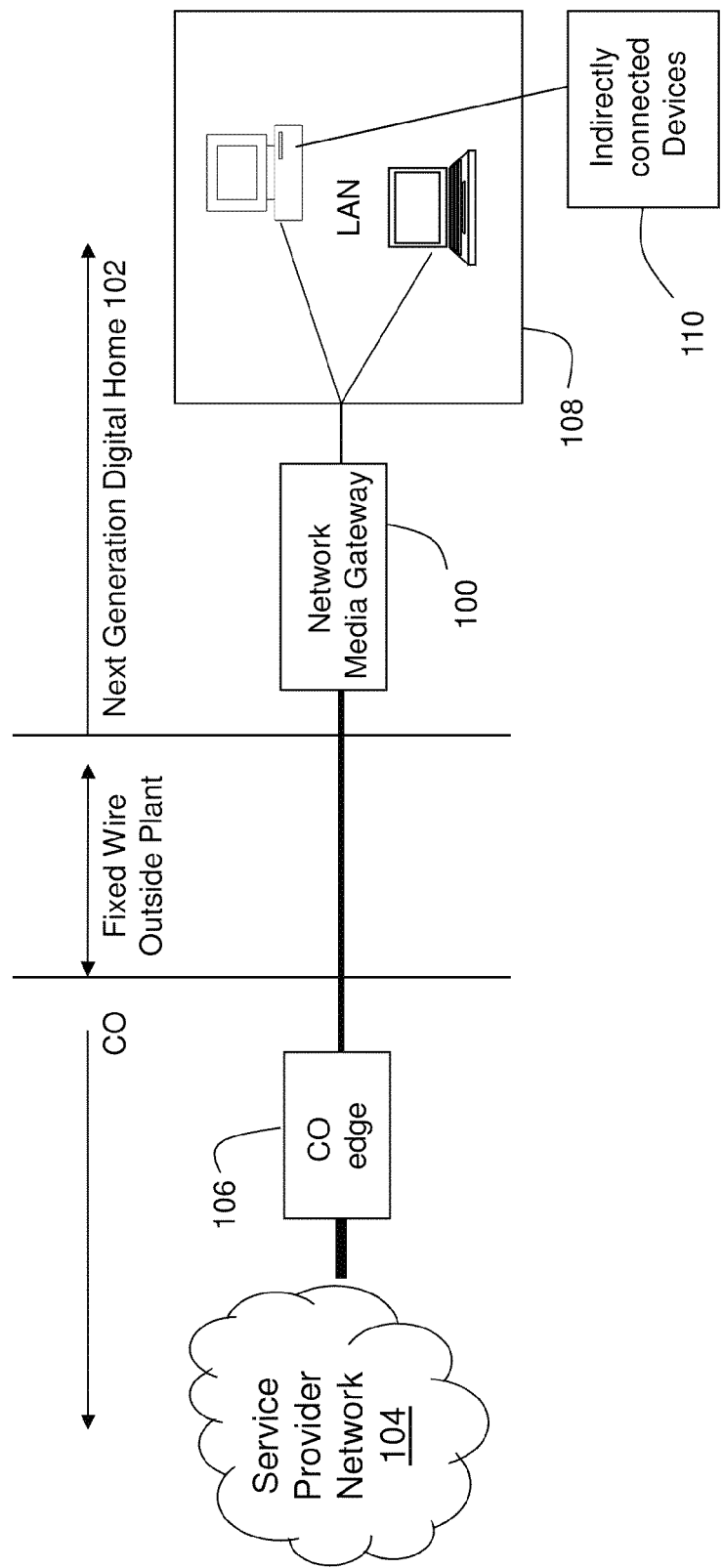
FIG. 1 illustrates security bridging between a Service Provider network and subscriber devices.

Referring to FIG. 1, a network media gateway (100) is used to bridge trust to the subscriber premises (102). The gateway is connected between the Service Provider's network (104) and the subscriber premises. In the illustrated embodiment the gateway is a CPE device disposed at the subscriber premises, interconnecting a Central Office ("CO") edge device (106) with in-home devices (108). However, the gateway need not necessarily be disposed at the subscriber premises.

Figure 2:
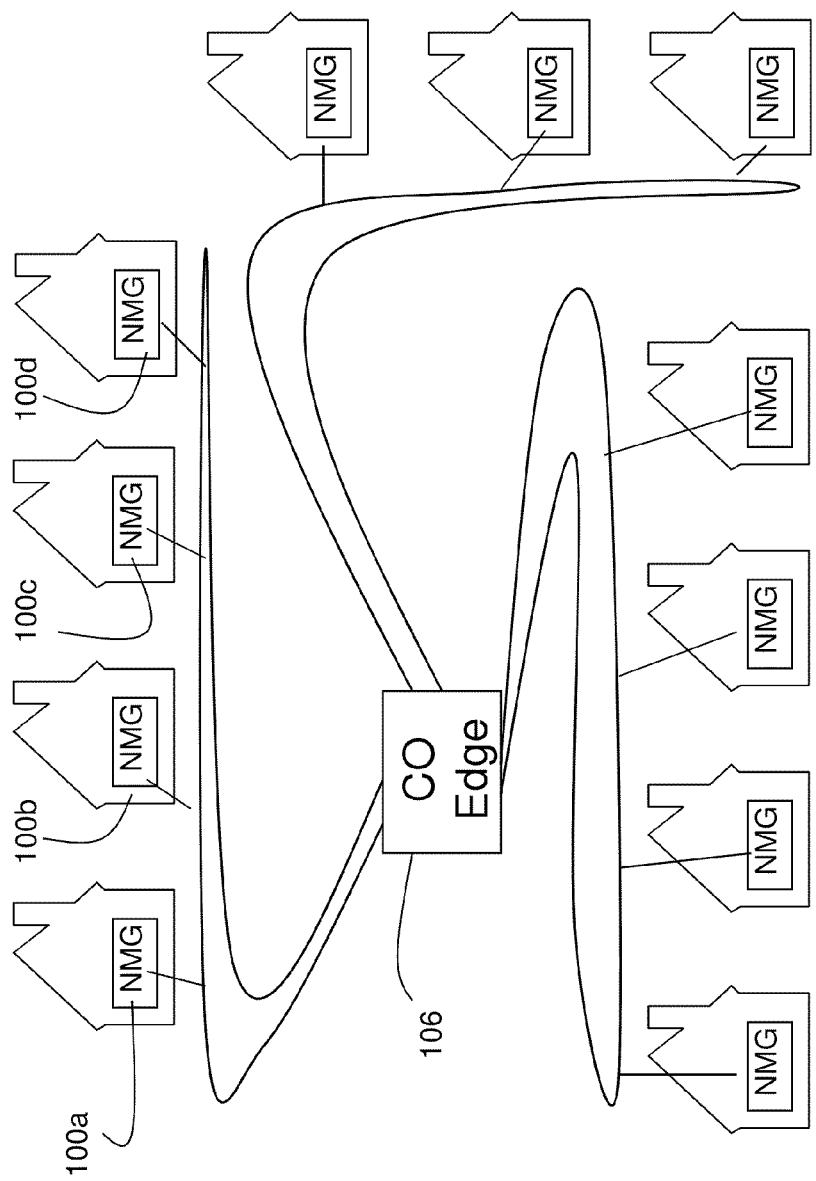
FIG. 2 illustrates use of network topology to facilitate gateway authentication.

Referring to FIGS. 1 and 2, the gateway (100) is trusted by the Service Provider based on successful execution of an authentication procedure. One technique by which the Service Provider can authenticate the gateway is by using knowledge of network topology. Individual gateways (100a-100d) on a local loop associated with the CO edge device (106) are identifiable via a unique identifier such as with a MAC address. The gateway identifier is known to the Service Provider because the Service Provider installs the gateways. Further, the Service Provider knows information about the subscriber associated with each individual gateway because that subscriber is a customer of the Service Provider. For example, the Service Provider knows where the gateway is connected on the loop. Further, the Service Provider knows which physical media, e.g., set of wires and which loop, is associated with communications with each subscriber's home and each individual gateway. Such identifying information could be maintained, for example, in a head-end device that monitors topology and generates an alert when, for example, an unauthorized gateway is connected to the network, or when an authorized gateway is moved within the network or removed from the network. In the absence of an alert, the gateway is trusted once initially authenticated. Topology-based authentication can be indirectly augmented by constructing the gateway in a tamper-proof enclosure, such as in accordance with FIPs 140-2.

Once authenticated by the Service Provider, the gateway (100) is permitted to provide a certain set of services to subscriber devices (108) that are directly connected with the gateway (via LAN or physical media) in order to provide the services to the subscriber. The services might include, but are not limited to, video, voice and data services. Examples of secondary, in-home devices include but are not limited to: a co-located digital media adapter; a co-located secondary Personal Computer ("PC"); CPE in another location within the Service Provider WAN; and CPE on a foreign Service Provider WAN that does not use the CPE Technology of the original Telco network. Before a service is provided to a subscriber device the gateway authenticates that device for the service. Further, authenticated subscriber devices can be tightly coupled with the gateway and other devices in the Service Provider network because they are deemed to be secure and trusted. Hence, providing a quantifiable QoE is facilitated by bridging of security via the gateway.

Under certain circumstances the gateway may permit authentication of subscriber devices (110) which are only indirectly connected with the gateway. In particular, the gateway may permit authenticated secondary devices to authenticate other devices. Depending on the capabilities of the secondary device, such extended authentication may be executed independently or with assistance from the gateway. For example, if the authenticated secondary device is capable of executing authentication protocols with other devices then that authenticated secondary device may be permitted to independently bridge security. However, if the authenticated secondary device is incapable of independent execution of authentication protocols then the gateway may function as an authentication proxy on behalf of the authenticated secondary device.

Figure 3:
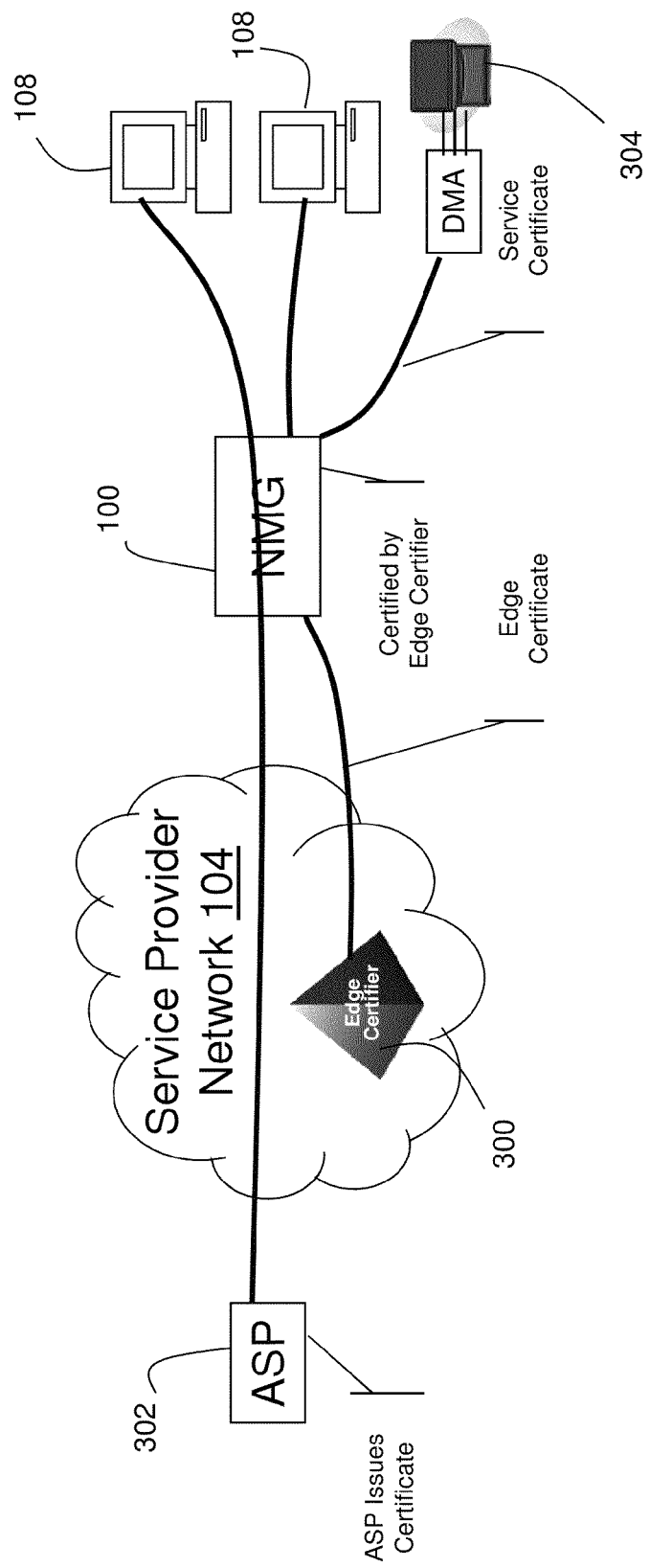
FIG. 3 illustrates certificate management via the gateway.

Referring now to FIG. 3, one technique for authenticating subscriber devices (108) is with a user interface for certificate management. Initially, the gateway (100) is fully authenticated as already described above. The gateway is then certified by an edge certifier (300) of the Service Provider network (104) for providing individual services, including managing distribution of certificates within the subscriber LAN. Once certified, the gateway (100) detects incoming certificates from the Service Provider network (104), including the destinations of the certificates. For example, an Application Service Provider (300) may issue a certificate identifying as a destination one of the subscriber devices (108). An encrypted record of each new certificate and associated destination is maintained by the gateway. A user interface (304) of the gateway (100) can then be used by the subscriber to manage which subscriber devices (108) on the subscriber LAN are allowed to participate in the services that have been certified. In other words, the subscriber is the policy enabler of the home. Security measures such as password protection may be employed to authenticate the subscriber before permitting use of the interface. Outgoing requests for certificate services are detected by the gateway and, if the requesting device has been authorized for the service via the user interface, the gateway allows the device to utilize the service. The gateway may also transmit an indication to the Service Provider when the service is utilized to facilitate billing.

Figure 4:
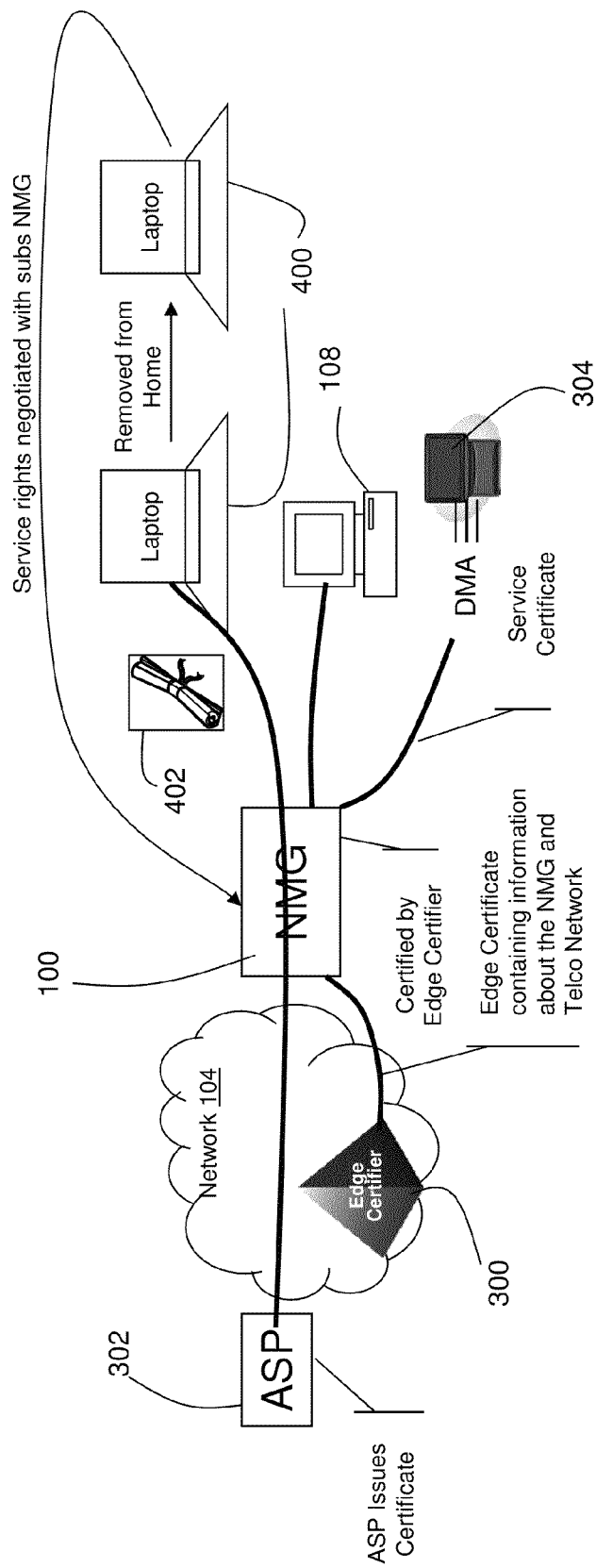
FIG. 4 illustrates certificate security with a mobile subscriber device.

Referring to FIG. 4, certificate management may also be employed to bridge security to a mobile device (400). An agent executed by the gateway monitors the presence of both mobile devices (400) and fixed devices (108) connected to the gateway via the home network. Using the interface (304) associated with the gateway (100), an authenticated subscriber can permit removal of the mobile device (400) from the premises without removal of the security bridge to that mobile device. In particular, in response to subscriber input at the interface (304) the gateway deposits a certificate of mobility (402) on the mobile device. The certificate of mobility identifies the Service Provider and the issuing gateway. At some point after the mobile device is removed from the customer premises LAN, the mobile device may issue a request for services that requires security bridging. The mobile device sends the certificate of mobility to the Service Provider with the service request. Following receipt of the certificate of mobility, the Service Provider determines whether the mobile device is associated with one of its subscribers. The determination is facilitated by examining the gateway identifier in the certificate of mobility and comparing the identified gateway with a record of subscriber gateways. If a match is located, the Service Provider relays the certificate of mobility to the subscriber's gateway. The gateway then validates the incoming mobility certificate and signals to the Service Provider to allow service delivery. The Service Provider will then deliver service to the mobile device.

The technique may also be employed where the relocated mobile device (400) is not directly connected with the network of the certificate-issuing Service Provider. The certificate of mobility provided to the mobile device contains an identifier of the issuing Service Provider and a unique key that identifies the home location of the mobile device. Upon remote re-acquisition of services, assuming a sanctioned removal from the home and through a secure and encrypted channel, the remote device will identify itself to the foreign network, and will make an attempt to contact the home network Service Provider through that foreign network. The home network Service Provider, having knowledge of the partial certificate issued to the mobile device, will then attempt to contact the gateway in the home by referencing the unique home location identifier from the mobile device certificate. At this point the gateway will query the mobile device for a unique authentication key that the subscriber will be required to keep secret. Once the key has been verified, service will be granted. This also enables the protection of issued certificates by extending the security of the network which in turn forms a complete certificate.

Figure 5:
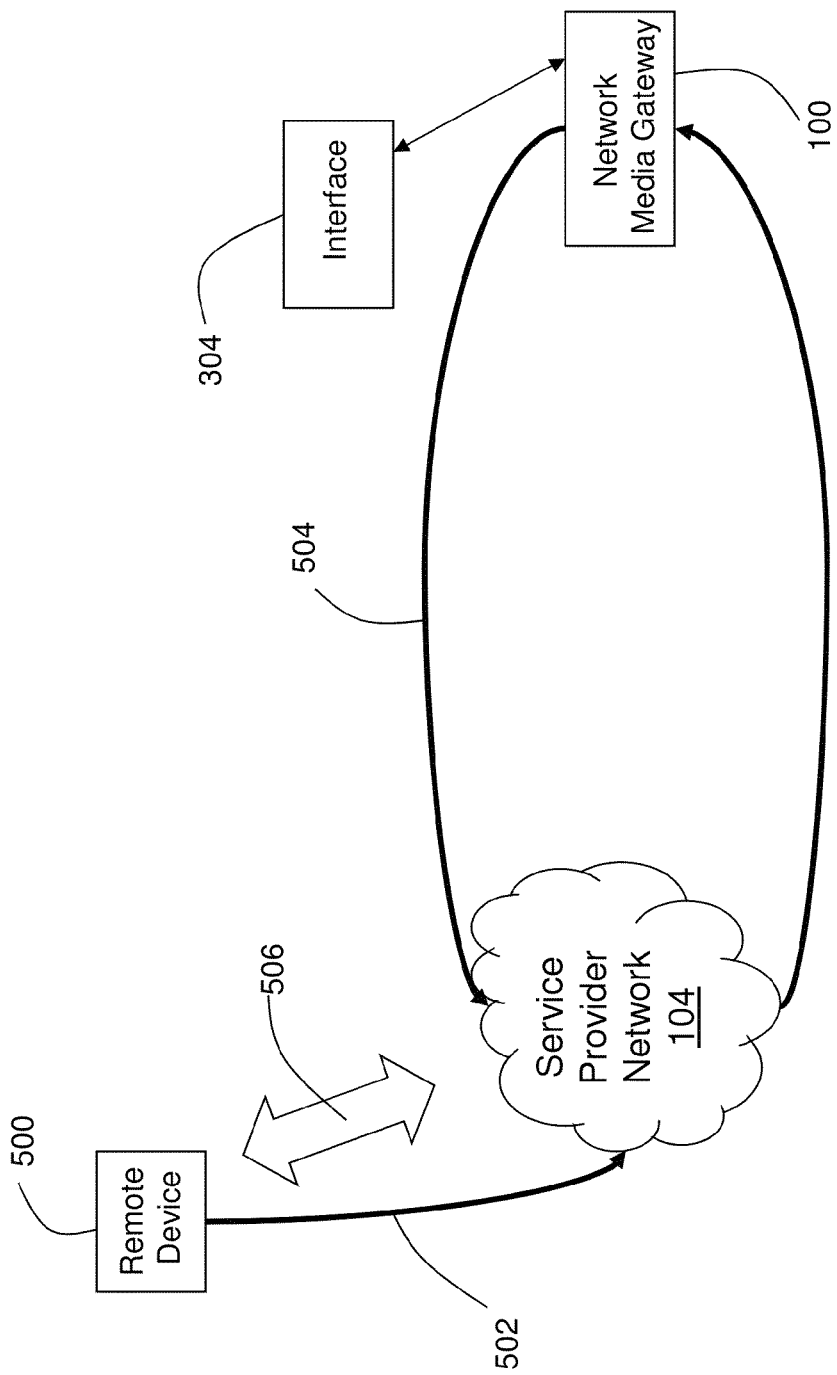
FIG. 5 illustrates authentication of a remote device using a digital co-signature.

Referring now to FIG. 5, trust can also be extended by digital co-signature. A remote device (500) that is not in the home LAN initiates the procedure by requesting authentication from a subscriber associated with the home LAN gateway. In particular, a request (502) for a digital co-signature is transmitted from the requesting remote device to the gateway (100) via the Service Provider network (104). At the subscriber's discretion the co-signature request may be granted, thereby authenticating the requesting device. In response to the grant of digital co-signature by the subscriber, the gateway (100) generates the co-signature (504) which is transmitted to the remote device (500). The co-signature can then be presented to a Service Provider by the requesting device in exchange for the service (506).

The digital co-signature contains encrypted references to the issuing Service Provider and authorizing gateway, and also contains an agent. Once the co-signature is used by the requesting device, that device notifies the authorizing gateway that the transaction has been successfully completed. In particular, the agent residing in the digital co-signature causes the notification to be transmitted to the gateway. The digital co-signature expires immediately after it is used by the third party. In particular, the agent causes the digital co-signature to be destroyed.

The digital co-signature may be based on a Private Key Infrastructure ("PKI") combined with authentication of the subscriber. The PKI is "private" due to the fact that its scope is limited to one edge device and any other requesting internet user for as long as the subscriber wishes to co-sign for that internet user. Any time the internet user wishes to execute a transaction based on the extended trust received from the subscriber, the internet user's platform will be required to renew its trust key. Trust keys may be limited to one-time use to prevent trust abuse and provide the subscriber a degree of distance from the internet user in the event that the relationship between the subscriber and internet user changes. Transactions, both requesting and authenticating, may also be IPSec encapsulated and thus secure.

Figure 6:
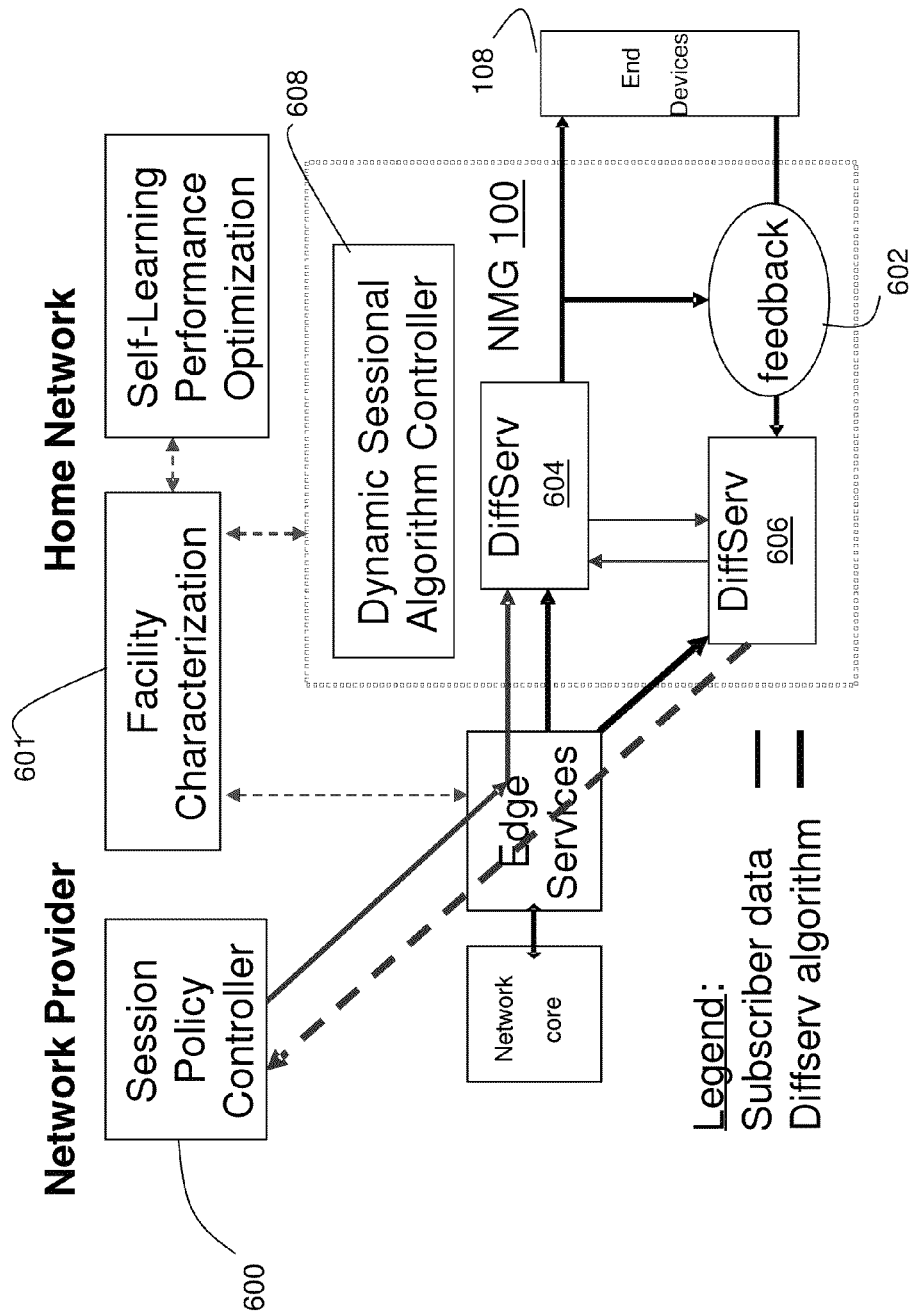
FIG. 6 is a block diagram illustrating the gateway of FIG. 1 in greater detail.

Referring now to FIG. 6, the gateway (100) may also be employed to support self-learning for queuing and application mapping. For example, the gateway may function as a policy enforcement point for delivery of multiple, simultaneous sessions of varying media with differing performance requirements, which may change in real time, with deterministic Quality of Experience ("QoE") such that individual services can be billed. The illustrated embodiment includes a session policy controller (600), an XML agent (601) in the gateway that collects network data, a feedback mechanism (602) that provides the self-learning ability, and a messaging mechanism to report updated models. The authenticated gateway is configured with a default policy and traffic management, e.g., DiffServ (604) configuration by the Service Provider network. The gateway agent learns the behavior of the subscriber's LAN and data usage patterns through observation. Once a usage pattern is recognized, the gateway generates an updated policy and traffic configuration (606). The gateway policy model (606) is continuously updated to provide further refinements in bandwidth usage. The gateway then periodically updates the policy configuration (604) and a Session Policy Controller (608) with the latest policy model (606) associated with the subscriber. Billing options may be offered to the subscriber if the usage model suggests lower cost.

In one embodiment the self-learning policy approach is applied to queue management for the broadband environment by loading a framework algorithm into the gateway. As each new session is selected by the subscriber, a new algorithm module is loaded. The framework algorithm has the ability for time variation in order to support, for example, a subscriber who requests two premium services, Service A and Service B, over a above the standard voice, video and data service. Because the subscriber may not always being using Service A and Service B, the framework algorithm autonomously shifts the queue weightings based on current usage to allow for the proper session service quality levels to be met. For example, when the Service B session ends, the framework algorithm re-shifts the queue weightings. Subsequently, if the subscriber adds a new session called Service C, a C algorithm session is downloaded and the framework again re-shifts the queue weightings. Because the queue algorithms running over time have changing weightings, QoE support is improved relative to static weighting.

Figure 7:
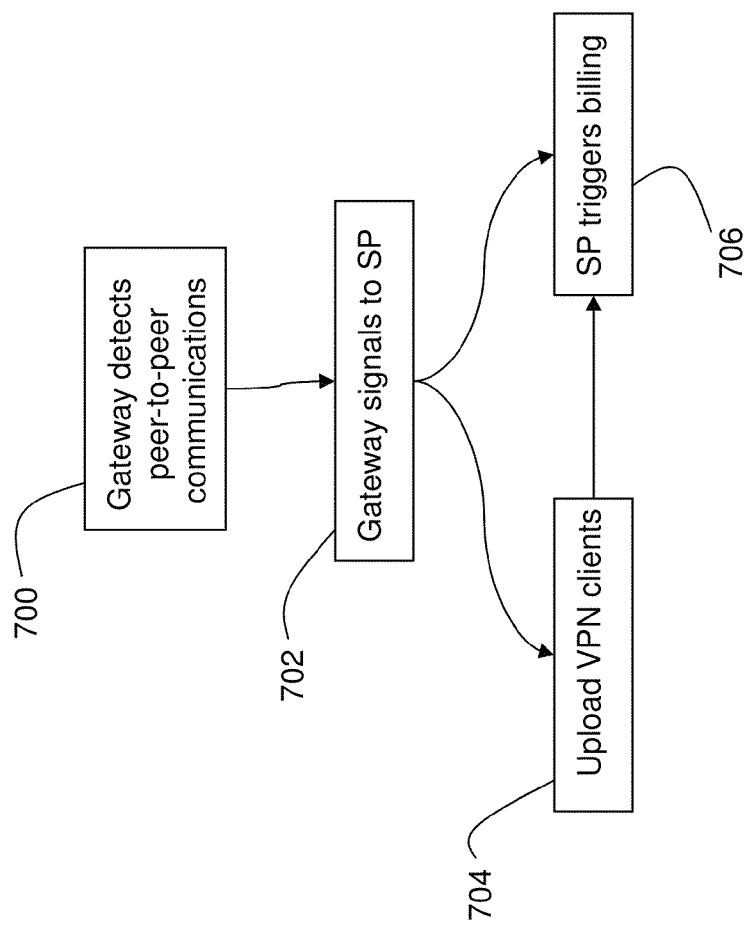
FIG. 7 is a flow diagram illustrating support for peer-to-peer communications.

Referring now to FIG. 7, another aspect of the invention is service creation through adhoc VPN facilitated Peer-to-Peer Networking. An authorized gateway containing a VPN client detects Peer-to-peer applications associated with the subscriber as shown in step (700). In response to detection of operation of a peer-to-peer application the gateway notifies the Service Provider as indicated in step (702). Hence, the Service Provider may institute billing the subscriber for the peer-to-peer services as indicated by step (706). Further, if multiple users are participating in peer-to-peer transactions with the subscriber then the subscriber's gateway can establish a closed VPN network of authorized users as indicated by step (704). The VPN is establish by the gateway uploading a VPN client to each remote user's device. Billing may also be triggered for the VPN service as indicated by step (706).

The remote users participating in the VPN may be associated with gateways on the same Service Provider WAN, or may be on a foreign Service Provider WAN that does not use gateways, provided the initiating subscriber has a gateway. Current advanced peer-to-peer applications get around detection within the network providers network by altering port number. This makes it difficult for network providers to identify and track peer-to-peer sessions on a session by session basis. More simple peer-to-peer applications may not alter port numbers to avoid detection, however the equipment currently existing in the Service Provider's network may not be capable of performing deep packet inspection on every packet transacted. However, the gateway reduces the burden of having to perform deep packet inspection on every packet by monitoring and tagging appropriate flows, and relaying information to the Service Provider.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method of providing a communication service from a communication network to at least one subscriber device connected to the communication network via a gateway device, the method comprising:

authenticating the gateway device using the communication network;

after authentication of the gateway device by the communication network, authenticating, by the gateway device, the at least one subscriber device on behalf of the communication network independently of authentication functionality of the communication network;

providing, by the gateway device, a mobility certificate to the at least one subscriber device when the mobile subscriber device is connected to the communication network via the gateway device, the mobility certificate identifying the gateway device;

when the mobile subscriber device is no longer connected to the communication network via the gateway device, receiving, by the communication network from the mobile subscriber device, a service request and a mobility certificate from one of the at least one subscriber device;

determining, via the communication network, whether to provide a service to the one of the at least one subscriber device based on the received service request and the received mobility certificate; and upon determining that the service is to be provided to the one of the at least one subscriber device, providing the communication service from the communication network via the gateway device identified by the mobility certificate to the one of the at least one subscriber device.

2. The method of claim 1, comprising:

after authentication of the gateway device by the communication network, certifying, by the communication network, the gateway device for providing a certified service and sending a certificate identifying the certified service to the gateway device;

receiving, at the gateway device, the certificate from the communication network; and based at least in part on the certificate, the gateway device giving access to the certified service to a subscriber device connected to the communication network via the gateway device.

3. The method of claim 2, wherein:

the gateway device maintains a record of the certificate; and the gateway device giving access to the certified service to the subscriber device is based at least in part on the certificate comprising the gateway device giving access to the certified service to the subscriber device based at least in part on the record of the certificate.

4. The method of claim 3, wherein:

receiving, at the gateway device, a request for the certified service from a subscriber device connected to the communication network via the gateway device; and giving access, by the gateway device, to the certified service to the subscriber device being based at least in part on the record of the certificate comprises:

the gateway device giving access to the certified service to the subscriber device based at least in part on the request and at least in part on the record of the certificate.

5. The method of claim 4, wherein:

the gateway device receives user input from an authorized user associated with the gateway device, the user input identifying whether at least one subscriber device connected to the gateway device should be permitted to access the certified service; and the gateway device giving access to the certified service to the subscriber device comprises the gateway device giving access to the certified service based at least in part on the request, at least in part on the record of the certificate and at least in part on the user input.

6. The method of claim 5, wherein at least some of the user input is captured in the record maintained for the certificate.

7. The method of claim 2, wherein the certificate identifies at least one subscriber device authorized to access the certified service.

8. The method of claim 2, further comprising transmitting, by the gateway device, an indication to the communication network when a subscriber device connected to the communication network via the gateway device using the certified service to facilitate billing for the certified service.

9. The method of claim 2, wherein the certifying, by the communication network, the gateway device for providing the certified service comprises an edge certifier of the communication network certifying the gateway device for providing the certified service.

10. The method of claim 1, wherein determining, by the communication network, whether to provide a service to the mobile subscriber device based on the service request and the mobility certificate comprises:

forwarding, by the communication network, the service request and the mobility certificate to the gateway device identified by the mobility certificate;

receiving and validating the mobility certificate by the gateway device; and signaling, by the gateway device, the communication network to provide access to the service based on validation of the mobility certificate.

11. The method of claim 10, wherein:

the communication network connected to the gateway device is a home network of the mobile subscriber device;

the mobility certificate comprises information that can be used to identify the home network of the mobile subscriber device; and forwarding, by the communication network, the service request and the mobility certificate to the gateway device identified by the mobility certificate is responsive to receiving the service request and the mobility certificate at the home network from a foreign network to which the mobile subscriber device is currently connected.

12. The method of claim 11, wherein validating the mobility certificate comprises verifying an authentication key of the mobile subscriber device.

13. The method of claim 12, wherein the gateway device queries the mobile subscriber device for the authentication key.

14. The method of claim 1, wherein the at least one subscriber device comprises a mobile subscriber device, the method further comprising:

when the mobile subscriber device is no longer connected to the communication network via the gateway device, receiving, by the gateway device from the mobile subscriber device via the communication network, an authentication request;

determining, by the gateway device, whether to provide service access to the mobile subscriber device in response to the authentication request; and based on determining that service access should be provided to the mobile subscriber device, sending, by the gateway device, a code via the communication network to the mobile subscriber device, the code enabling the mobile subscriber device to access service using the code.

15. The method of claim 14, wherein determining that service access should be provided to the mobile subscriber device comprises receiving, at the gateway device, permission from a user to grant service access to the mobile subscriber device.

16. The method of claim 15, wherein the code is a digital signature.

17. The method of claim 16, wherein the digital signature is based at least in part on a private key infrastructure.

18. The method of claim 16, wherein the digital signature includes an agent configured to signal the gateway device that the requested service has been provided.

19. The method of claim 16, wherein the digital signature comprises an agent configured to destroy the digital signature once the digital signature has been used.

* * * * *